H. F. MEYER.
SEAT.
APPLICATION FILED SEPT. 10, 1912.
1,107,090.
Patented Aug. 11, 1914.
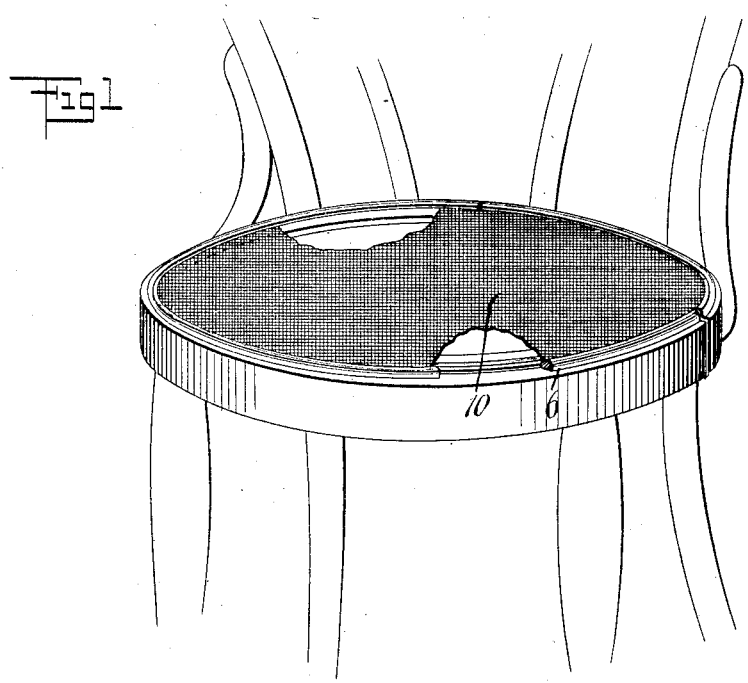
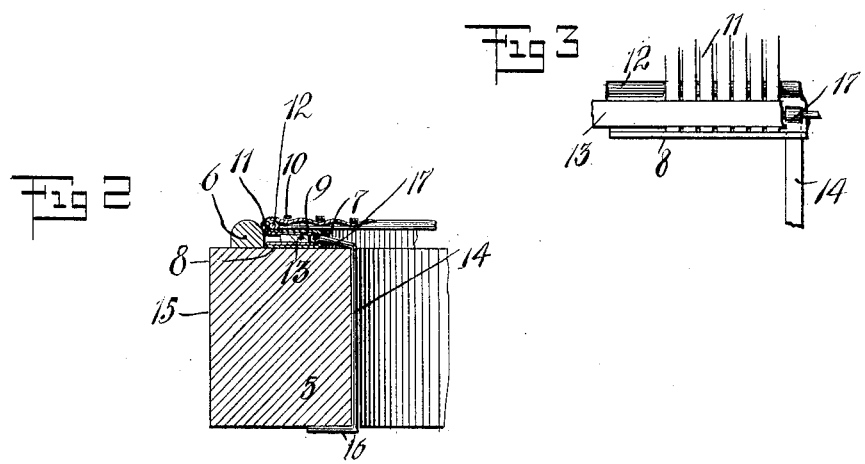
WITNESSES
C. J. Hachenberg
E. B. Marshall
INVENTOR
Henry F. Meyer.
BY Munn & Co
ATTORNEYS

UNITED STATES PATENT OFFICE.

HENRY FREDERICK MEYER, OF NEW YORK, N. Y.

SEAT.

1,107,090.  Specification of Letters Patent.  Patented Aug. 11, 1914.

Application filed September 10, 1912. Serial No. 719,508.

*To all whom it may concern:*

Be it known that I, HENRY F. MEYER, a citizen of the United States, and a resident of the city of New York, borough of Brooklyn, in the county of Kings and State of New York, have invented a new and Improved Seat, of which the following is full, clear, and exact description.

My invention has for its object to provide a convenient and durable means for securing seats to chairs, cars, lounges, etc. The seat may be constructed of cane, leather, cloth or ratan, and is held in place on the seat frame and within a bead on the frame by bending the edge of the seat between the inner side of a U-shaped member and a slat disposed in the U-shaped member. The U-shaped member is secured to the seat frame within the bead preferably by a strap which extends through the seat member and down at the inner side of the seat frame, the lower terminal of the strap being bent under and against the bottom of the seat frame. My seat, with the means for securing it to a chair, may be constructed at very little expense, and it is especially well adapted for use in repair work as it may be sold and be secured without trouble to a chair by the purchaser.

Additional objects of the invention will appear in the following complete specification, in which the preferred form of the invention is disclosed.

In the drawings the similar characters of reference indicate corresponding parts in all the views, in which—

Figure 1 is a perspective view showing a portion of a chair to which a seat member is secured by my improvement; Fig. 2 is a transverse sectional view of a portion of a seat frame, showing the means provided for securing the seat member to the said frame; and Fig. 3 is a fragmentary front view of the seat showing its construction.

By referring to the drawings it will be seen that the seat frame 5 is provided with a bead 6 at the inner side of which, and against the seat frame there is disposed a U-shaped member 7, the side 8 of the U-shaped member 7 being disposed against the seat frame, and the side 9 of the U-shaped member 7 being spaced therefrom. The seat member 10, which may be of cane, as shown in the drawings, has an edge 11, which extends from the top of the U-shaped member 7 around the rim 12, of the U-shaped member 7, and then between the inner sides of the U-shaped member and the upper, inner and lower faces of the slat 13, which is disposed between the sides 8 and 9 of the U-shaped member. The slat 13, the edge 11 of the seat and the U-shaped member are held together by glue. It will therefore be seen that the edge 11 of the seat member 10 will be wedged between the inner side of the U-shaped member 7 and the said slat 13. While it is possible to secure the U-shaped member 7 to the seat frame 5, and within the bead 6, by means of nails, driven through the seat member 10, the sides 9 and 8 of the U-shaped member and the slats, the nails or tacks entering the seat member 5, I prefer to secure the U-shaped member 7 to the seat frame 5 by means of straps 14, which are secured to the rim 17 disposed between the slat 13 and the central portion of the U-shaped member, the straps 14 extending out through openings in the seat member 10 and the U-shaped member 7 and down the inner side of the seat frame to the bottom 16 of the seat frame where the terminals 17 of the straps 14 are bent outwardly and against the under side 16 of the seat frame. These straps 14 may be made strong enough so that when their terminals are bent against the bottom 16 of the seat frame 5, they will hold the seat in place.

With this construction the seat members 10 may be sold with the U-shaped members 7 and the slats 13 in place, so that they may be readily slipped on a seat frame 5 by means of the straps 14, which may be disposed against the inner sides of the seat frame 5. When the seat member 10 is in place, and the U-shaped member 10 is in position, the terminal 17 of the straps 14 may be bent against the bottom 16 of the seat frame 5, when it will be found that the seat member 10 will be held in position for use.

Having thus described my invention, I claim as new and desire to secure by Letters Patent:

1. In a seat, a member U-shaped in cross section disposed with one of its sides above the other and with its ends at its outer side, a slat disposed between the sides of the member, a seat member having an edge extending over the upper side of the first mentioned member and between the inner sides of the first mentioned member and the upper and inner ends of the slat, and means for securing the first mentioned member to a seat frame.

2. In a seat, a member U-shaped in cross section disposed with one of its sides above the other and with its ends at its outer side, the member at its upper and outer ends having a rim, a slat disposed between the sides of the member, a seat member having an edge extending over the upper side of the first mentioned member around the rim and between the inner sides of the first member and the upper and lower surfaces of the slat and means securing the first mentioned member to a seat frame.

3. In a seat, a member U-shaped in cross section having an opening and disposed with one of its sides above the other, and with its ends at its outer side, a seat member, means for securing the seat member to the first mentioned member, a rim disposed in the first mentioned member, and straps secured to the rim and extending through the opening and downward for engagement with the seat frame.

In testimony whereof I have signed my name to this specification in the presence of two subscribing witnesses.

HENRY FREDERICK MEYER.

Witnesses:
HENRY J. HOLZBERGER,
JOHN SEIKEL.

---

Copies of this patent may be obtained for five cents each, by addressing the "Commissioner of Patents, Washington, D. C."